United States Patent [19]

Oliver et al.

[11] Patent Number: 4,547,422
[45] Date of Patent: Oct. 15, 1985

[54] FABRIC REINFORCED MULTIPLE PLY CONVEYOR BELT

[75] Inventors: Brian H. Oliver; Harold A. Blinn; Robert I. Carvalho, all of Akron, Ohio

[73] Assignee: The Goodyear Tire & Rubber Company, Akron, Ohio

[21] Appl. No.: 367,208

[22] Filed: Apr. 12, 1982

[51] Int. Cl.$^4$ .................. B65G 15/34; B65G 15/38
[52] U.S. Cl. .................... 428/286; 156/137; 198/847; 428/290; 428/475.8; 428/506; 428/520
[58] Field of Search ............. 428/286, 290, 475.8, 428/506, 520; 156/137; 198/847

[56] References Cited

U.S. PATENT DOCUMENTS 3,738,859  6/1973  Anderson et al. .
4,128,539  12/1978  Onizawa ...................... 525/533
4,216,856  8/1980  Moring et al. .

Primary Examiner—James C. Cannon
Attorney, Agent, or Firm—J. D. Wolfe; R. D. Thompson

[57] ABSTRACT

A polyvinyl chloride composition fabric reinforced belt said composition comprising a blend of 100 parts of polyvinyl chloride with about 10 to 30 parts of a copolymer of butadiene acrylonitrile.

4 Claims, No Drawings

FABRIC REINFORCED MULTIPLE PLY CONVEYOR BELT

TECHNICAL FIELD

This invention relates to an essentially polyvinyl chloride fabric reinforced multiple ply belt capable of passing the specification of the U.K. National Coal Board for underground belting (NCB 158).

BACKGROUND

Although multiply thermoplastic polyvinyl chloride conveyor belts can be made to pass the U.K. National Coal Board specification for underground belting (NCB 158) the manufacture of such belting requires high capital investment to handle the polyvinyl chloride since the conventional dry rubber processing/curing equipment cannot be used to produce these belts.

DISCLOSURE AND PRACTICE OF THE INVENTION

I have discovered that plied up essentially polyvinyl chloride coated fabric belts which pass the U.K. National Coal Board specification (NCB 158) for underground belting can be produced on conventional belt making calenders and press equipment and thus avoid the need for the special high cost equipment to handle thermoplastics. I have discovered that if polyvinyl chloride (100 parts) is fused in a mill or related equipment with 10 to 30 parts acrylonitrile butadiene rubber (18 to 67 percent acrylonitrile), the resulting composition can be calendered onto the fabric and laminated with heat and pressure in either a press or a rotocure to give a conveyor belt that will pass the U.K. National Coal Board specification (NCB 158) for underground belting. This composition is not completely thermoplastic like the prior art polyvinyl chloride belts, but when cured with a sulfur curative exhibits some properties of a thermoset material. Hence the compositions of this invention permit the plies to be laminated together with heat and pressure and eliminate the cooling cycle required to get release during the pressing step with thermoplastic materials. Hence the energy used is less and the press is not subjected to strain of repeated heating and cooling cycles.

The fabric used to reinforce this belt can be any of the conventional ones such as polyamide or rayon/cotton and polyamide/polyester but the high melting point fabrics such as the polyamides are preferred. Also the fabric can be any of the conventional weaves but the relatively open weave polyamide fabrics are preferred.

It is preferred that the fabric be dipped in a dipping agent such as the conventional RFL dips. viz resorcinol/formaldehyde latex dip used to dip belting fabric and tire fabric before the rubber, in this invention, the polyvinyl chloride composition is calendered onto the fabric. Also, the conventional polyvinyl chloride dips can be used. Normally it is desirable that the fabric pick up about 7 percent by weight during the dipping step.

The dipped fabric is fed to a calender containing a low bank of the polyvinyl chloride composition containing the copolymer of butadiene/acrylonitrile blended therein to coat to the desired gauge, 020 to 040 mils, on each side. Since the polyvinyl chloride composition exhibits little evidence of tackiness at about 100° C., the temperature of the calender rolls, it is surprising to find it calenders and holds onto the fabric so readily.

The calendered fabric is passed to the press preferably over individual take up and let off rolls to give the desired number of plies, viz two, three or four, and then the press is closed to laminate the plies together. It is desirable to coat the platens of the press with a suitable mold release such as a silicone. Usually about 30 to 40 minutes in the press at 310° F. (155° C.) at low pressure (10–50 pounds per square inch) is sufficient to achieve 50 pound levels of adhesive to fabric. Also, instead of a platten press, the plied up polyvinyl chloride composition coated fabric such as polyester can be passed through a rotocure press to laminate the plies to yield the belt with high levels of ply adhesion.

A three ply 106 centimeter wide, 0.08 centimeter×0.08 centimeter, conveyor belt was produced using the following recipe to coat the open weave nylon fabric after it had been dipped. The open weave nylon fabric (105 pounds) was passed through a dip tank containing a dip agent at a rate to pick up preferably 7 percent by weight of the dip agent. The dip coating was dried to remove the solvent, viz water. The dip agent was formed by dissolving 8.9 parts of resorcinol in water and the resorcinol solution was added to 72 parts water and then formaldehyde (6.6 parts) was added followed after sufficient stirring with 5.0 parts of a 10 percent solution of caustic soda. After about 3 hours 15 parts of a acrylonitrile butadiene copolymer latex and 60 parts of a polyvinyl chloride latex were added and the stirring continued for 12 hours. Total water used was 142 parts on a total recipe basis to yield 20 percent solids.

RFL dipping agent or any of the usual and well known RFL fabric dips as disclosed above may be used. The coating agent composition for the fabric was made by banbury mixing the ingredients listed in the following coating recipe.

| Ingredient | Parts by Weight |
| --- | --- |
| Polyvinyl chloride | 100.0 |
| Acrylonitrile butadiene rubber (33% acrylonitrile) (NBR) | 25.0 |
| Conductive carbon black | 9.0 |
| Zinc oxide | 5.1 |
| Tricresyl phosphate | 60.0 |
| Calcium carbonate | 30.0 |
| Stearic acid | 1.3 |
| Phenolic antioxidant | 1.3 |
| Polyvinyl chloride stablizier, soap type | 1.0 |
| Epoxidized soybean oil | 1.0 |
| Soybean oil | 5.0 |
| Sulfur | 1.8 |
| Sulfenamide accelerator | 1.2 |
| Phthalimide retarder | 0.5 |
| | 242.2 |

In a preferred practice the NBR rubber, carbon black, stabilizers, zinc oxide and stearic acid is formed into a masterbatch which is then fused with the other ingredients in a banbury to give the coating.

This coating composition was calendered onto the fabric at about 100° to 110° C. roll temperature to give a calendered stock having a gauge of 0.13 centimeter. As indicated previously a dipped fabric is preferred.

The inside ply had the coating agent applied to both sides of the fabric whereas the outside fabric plies only had the coating agent applied to one side.

A suitable press such as regular belt press or a rotocure press had the press surfaces covered with a mold release agent such as polyethylene glycol or a silicone. Then the calendered stock was piled up in the press to give a three ply laminate where the inside ply was coated on both surfaces. The press was closed and the laminate cured 45 minutes at 310° F. (150° C.)

The resulting belt passed the belt drum friction test of the NCB 158 specification with a maximum test temperature of 467° F. (241° C.) more than 100° F. (37.7° C.) below the test failure temperature of the specification.

In a preferred recipe part of the polyvinyl chloride is replaced with 5 to 30 parts of polyvinyl chloride/acetate copolymer in the coating recipe as it gives higher ply adhesion in the laminated belt.

While certain representative embodiments and details have been shown for the purpose of illustrating the invention is will be apparent to those skilled in this art that various changes and modifications may be made therein without departing from the spirit or scope of the invention.

I claim:

1. A plied up belt capable of passing the U.K. National Coal Board Specification [NCB158] for underground belting including laminated plies of coated fabric, said coated fabric being formed by calendering a fused blend of 100 parts of polyvinyl chloride and 10 to 30 parts of acrylonitrile/butadiene rubber containing 18 to 67 percent acrylonitrile which contains no amino acid curative on to said fabric.

2. The belt of claim 1 wherein the fabric contains a dip coat of a resorcinol/formaldehyde latex.

3. The belt of claim 2 wherein the blend of polyvinyl chloride and acrylonitrile butadiene rubber contains sulfur and zinc oxide as the curative.

4. The belt of claim 3 wherein the curative contains a sulfenamide accelerator.

* * * * *